2,889,294
Patented June 2, 1959

2,889,294

RESINOUS REACTION PRODUCT OF AN ALIPHATIC POLYCARBOXYLIC ACID, CERTAIN OIL ACIDS, AN ADDUCT OF ETHYLENE OXIDE AND CERTAIN POLYHYDRIC ALCOHOLS AND ROSIN ACIDS

Ralph E. Layman, Jr., Stamford, Conn., assignor to American Cyanamid Company, New York, N.Y., a corporation of Maine No Drawing. Original application April 2, 1956, Serial No. 575,363. Divided and this application April 19, 1956, Serial No. 579,158

16 Claims. (Cl. 260—22)

This invention relates to a novel composition of matter comprising the reaction product of (a) an aliphatic polycarboxylic acid, (b) an unsaturated oil fatty acid, (c) the adduct of ethylene oxide with a polyhydric alcohol having at least 5 carbon atoms and 4 hydroxy groups and (d) rosin acids, and to the process of preparing the same.

One of the objects of the present invention is to produce a reaction product of the class described both hereinabove and in greater detail hereinbelow which will have utility primarily as an emulsifier. A further object of the present invention is to produce an emulsifier which when combined in physical admixture with a glyceride oil modified alkyd resin, coating compositions of unusually desirable properties are produced. These and other objects of the present invention will be discussed in greater detail hereinbelow.

This application is a division of my copending application having the Serial Number 575,363, filed April 2, 1956, entitled Mixture of Certain Oil Modified Alkyd Resins Blended with a Resinous Reaction Product of Certain Acids With an Adduct of an Alkylene Oxide With Certain Polyhydric Alcohols. In said copending application, in which I am one of the co-inventors, there is disclosed and claimed a composition comprising a mixture of a glyceride oil modified alkyd resin and the compositions of the present invention and the process of preparing the same.

THE ADDUCT

The adduct used in the composition of the present invention is prepared by reacting ethylene oxide with a polyhydric alcohol having at least 5 carbon atoms and at least 4 alcoholic hydroxy groups. Special groups of polyhydric alcohols are used to form the adduct with ethylene oxide. The alcohols must have at least 5 carbon atoms and at least 4 hydroxy groups such as pentaerythritol. Representative members of this category of polyhydric alcohols, in addition to pentaerythritol, are dipentaerythritol, sorbitol, mannitol, $\alpha$, methyl $\Delta$ glucoside and the like. These polyhydric alcohols may be used either singly or in combination with one another.

These adducts may be prepared by reacting ethylene oxide with a polyhydric alcohol over a comparatively wide range of molecular weights. For instance, one may use between about 3 mols of ethylene oxide per hydroxy group in the alcohol to about 7 mols of ethylene oxide per hydroxy group of the polyhydric alcohol. Preferably, one would use about 5 mils of ethylene oxide per hydroxy group in the polyhydric alcohol.

The adduct thus prepared is then reacted with an aliphatic carboxylic acid and glyceride oil fatty acid and preferably an unsaturated fatty acid such as those mentioned hereinabove. Of the polycarboxylic acids, which may be used, one can readily utilize either the saturated or the unsaturated polycarboxylic acids. The alpha, beta ethylenically unsaturated polycarboxylic acids which may be used are maleic, fumaric, aconitic, itaconic, and the like. Whenever available, the anhydrides of these acids may be used. Still further, these acids and/or their anhydrides may be used singly or in combination with one another. Amongst the saturated aliphatic polycarboxylic acids which may be used are malonic, succinic, glutaric, sebacic, adipic, pimelic, suberic, azelaic, citric, tartaric, malic, tricarballylic and the like. These polycarboxylic acids and/or their anhydrides, whenever available, may be used in combination with one another or in combination with the alpha, beta ethylenically unsaturated polycarboxylic acids and/or their anhydrides.

Among the fatty acids which are reacted with the adduct together with the aliphatic polycarboxylic acids are the fatty acids derived from animal and vegetable oils. Although these fatty acids may be saturated, for best results, it is preferred that the unsaturated fatty acids be used, particularly those which have 18 carbon atoms in the chain. Illustrative of these preferred fatty acids are oleic, linoleic, linolenic, elaeostearic, licanic, ricinoleic and the like. One could use fatty acids having a lesser number of carbon atoms in the chain such as myristoleic, palmitoleic and the like, or even erucic and the like. These fatty acids may be used either singly or in combination with one another. When the adduct, which is a complex polyhydric alcohol is reacted with the mixture of acids, a sufficient amount of adduct should be utilized to insure that upon substantially complete esterification based on relatively low acid number and on stoichiometrical calculations that there will be an excess of about 20-25% hydroxyl compound to get such a result. When the estification reaction is completed, the acid number may vary between about 5 and 100, but preferably about 15-20.

The total amount of rosin acid which may be utilized in the composition of the present invention may vary between about 1% and 60% by weight based on the total resin solids of the composition. For optimum results the rosin acid content will fall within about 25% and 30% by weight based on the total resin solids of the composition.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with thermometer, stirrer and reflux condenser, inert gas inlet and outlet tubes, there is introduced 300 parts of the adduct of 1 mol of sorbitol and 30 mols of ethylene oxide, 24 parts of fumaric acid, 157 parts of linseed oil fatty acids, and 24 parts of gum rosin. The mixture is heated gradually with constant stirring to a temperature about 230–235° C. under an atmosphere of nitrogen gas until an acid number of 22 is reached. The resin thus produced is cooled to 100° C. and is cut to a 50% solids solution with water.

Example 2

Into a suitable reaction vessel equipped as in Example 1, there is introduced 510 parts of an adduct of 1 mol of sorbitol and 20 mols of ethylene oxide, 380 parts of linseed oil fatty acids, 162 parts of gum rosin, 58 parts of fumaric acid. The charge is heated gradually to about 235° C. while continuously bubbling nitrogen gas therethrough. The charge is held for an acid number of 25.1, cooled and poured solid.

Example 3

Into a suitable reaction vessel equipped as in Example 1, there is introduced 600 parts of the reaction product of 1 mol of sorbitol and 30 mols of ethylene oxide, 314 parts of linseed oil fatty acids, 134 parts of rosin and 48 parts of fumaric acid. The charged materials are heated gradually to about 230° C. and maintained at that temperature with nitrogen gas bubbling therethrough until an acid number of 20.0 is obtained. The reaction product thus produced is cooled to 150° C. and poured out into a suitable container.

Example 4

Into a suitable reaction vessel equipped as in Example 1, there is introduced 191 parts of the reaction product of 1 mol of dipentaerythritol and 30 mols of ethylene oxide, 32.5 parts of gum rosin, 76 parts of linseed oil fatty acids, 11.6 parts of fumaric acid. The charge is then mixed thoroughly together and reacted at a temperature of about 230° C. for about 2 hours, cooled to 100° C. and poured into a suitable container. The acid number was 25.2.

Example 5

Into a suitable reaction vessel equipped as in Example 1, there is introduced 59 parts of succinic acid, 380 parts of linseed oil fatty acids, 162 parts of gum rosin and 725 parts of the adduct of 1 mol of sorbitol and 30 mols of ethylene oxide. The charge is mixed together and then reacted at a temperature of about 245° C. to an acid number of 16.8. The charge is cooled and poured.

Example 6

Into a suitable reaction vessel equipped as in Example 1, there is introduced 27 parts of succinic acid, 242 parts of linseed oil fatty acids and 325 parts of the adduct of 1 mol of sorbitol and 30 mols of ethylene oxide. The charge is mixed and then heat reacted at 230° C. until an acid number of 11.0 is reached. The charge is cooled and poured into a suitable container.

Example 7

Into a suitable reaction vessel equipped as in Example 1, there is introduced 58 parts of fumaric acid, 380 parts of linseed oil fatty acids, 162 parts of gum rosin and 757 parts of the adduct of 1 mol of sorbitol and 30 mols of ethylene oxide. The charge is heated at about 240° C. for about 4 hours to an acid number of 22.4. The charge is cooled and poured into a suitable container.

The principal end use of the compositions of the present invention will be in the field of coating resins particularly when used in admixture with glyceride oil modified alkyd resins. Such mixtures may be used as primers, undercoats or topcoats. Additionally such mixtures may be used as adhesives or in the treatment of textile fibers and fabrics or in the coating of paper or in the sizing of paper or paper pulp.

The composition of the present invention may be, if desired, modified by blending with other resinous materials either water soluble or oil soluble, such as the aminoplast type resinous materials, such as the alkylated or non-alkylated melamine-formaldehyde resins, urea-formaldehyde resins, benzoguanamine - formaldehyde resins, dicyandiamide-formaldehyde resins or the thermoplastic latices such as the butadiene-styrene latices or the styrene-acrylonitrile latices or the acrylate latices and the like.

The compositions of the present invention will find utility in compositions other than oil-modified alkyd resin as disclosed and claimed in my earlier application referred to hereinabove such as an emulsifier for chlorinated rubber, nitrocellulose, mineral oils, vegetable oils, animal oils and fats, petroleum hydrocarbon resins, ester waxes, paraffin waxes, asphalt and the like.

The components of the composition of the present invention may be varied over a fairly wide range, depending on the particular utility to which the ultimate composition will be put. By way of illustration but not limitation, the ratio of the adduct to the unsaturated oil fatty acid on a weight basis may be varied between 100:13 and 100:170, respectively. The weight ratio of the adduct to the aliphatic polycarboxylic acid may be varied between 100:2.5, and 100:17.5, respectively. The weight ratio of the unsaturated oil fatty acid to the aliphatic polycarboxylic acid may be varied between about 100:3 and 100:30 in parts by weight, respectively.

I claim:

1. A composition of matter comprising the resinous reaction product of (a) an aliphatic polycarboxylic acid, (b) an unsaturated oil fatty acid, (c) the adduct of ethylene oxide with a polyhydric alcohol having at least 5 carbon atoms and at least 4 hydroxy groups and (d) from about 1% to about 60% by weight based on the total resin solids of the composition of rosin acids wherein said adduct contains from about 3 mols to about 7 mols of ethylene oxide per hydroxy group of the polyhydric alcohol.

2. A composition of matter comprising the resinous reaction product of (a) an aliphatic polycarboxylic acid, (b) an unsaturated oil fatty acid, (c) the adduct of ethylene oxide with sorbitol and (d) from about 1% to about 60% by weight based on the total resin solids of the composition of rosin acids wherein said adduct contains from about 3 mols to about 7 mols of ethylene oxide per hydroxy group in the sorbitol.

3. A composition of matter comprising the resinous reaction product of (a) an aliphatic polycarboxylic acid, (b) an unsaturated oil fatty acid, (c) the adduct of ethylene oxide with pentaerythritol and (d) from about 1% to about 60% by weight based on the total resin solids of the composition of rosin acids wherein said adduct contains from about 3 mols to about 7 mols of ethylene oxide per hydroxy group in the pentaerythritol.

4. A composition of matter comprising the resinous reaction product of (a) an aliphatic polycarboxylic acid, (b) an unsaturated oil fatty acid, (c) the adduct of ethylene oxide with dipentaerythritol and (d) from about 1% to about 60% by weight based on the total resin solids of the composition of rosin acids wherein said adduct contains from about 3 mols to about 7 mols of ethylene oxide per hydroxy group in the dipentaerythritol.

5. A composition of matter comprising the resinous reaction product of (a) fumaric acid, (b) an unsaturated oil fatty acid, (c) the adduct of ethylene oxide with a polyhydric alcohol having at least 5 carbon atoms and at least 4 hydroxy groups and (d) from about 1% to about 60% by weight based on the total resin solids of the composition of rosin acids wherein said adduct contains from about 3 mols to about 7 mols of ethylene oxide per hydroxy group of the polyhydric alcohol.

6. A composition of matter comprising the resinous reaction product of (a) maleic anhydride, (b) an unsaturated oil fatty acid, (c) the adduct of ethylene oxide with a polyhydric alcohol having at least 5 carbon atoms and at least 4 hydroxy groups and (d) from about 1% to about 60% by weight based on the total resin solids of the composition of rosin acids wherein said adduct contains from about 3 mols to about 7 mols of ethylene oxide per hydroxy group of the polyhydric alcohol.

7. A composition of matter comprising the resinous reaction product of (a) fumaric acid, (b) an unsaturated oil fatty acid, (c) the adduct of ethylene oxide with sorbitol and (d) from about 1% to about 60% by weight based on the total resin solids of the composition of rosin acids wherein said adduct contains from about 3 mols to about 7 mols of ethylene oxide per hydroxy group in the sorbitol.

8. A composition of matter comprising the resinous reaction product of (a) maleic anhydride, (b) an unsaturated oil fatty acid, (c) the adduct of ethylene oxide with sorbitol and (d) from about 1% to about 60% by weight based on the total resin solids of the composition of rosin acids wherein said adduct contains from about 3 mols to about 7 mols of ethylene oxide per hydroxy group in the sorbitol.

9. A composition of matter comprising the resinous reaction product of (a) fumaric acid, (b) an unsaturated oil fatty acid, (c) the adduct of ethylene oxide with pentaerythritol and (d) from about 1% to about 60% by weight based on the total resin solids of the composition of rosin acids wherein said adduct contains from about 3 mols to about 7 mols of ethylene oxide per hydroxy group in the pentaerythritol.

10. A composition of matter comprising the resinous reaction product of (a) maleic anhydride, (b) an unsaturated oil fatty acid, (c) the adduct of ethylene oxide with pentaerythritol and (d) from about 1% to about 60% by weight based on the total resin solids of the composition of rosin acids wherein said adduct contains from about 3 mols to about 7 mols of ethylene oxide per hydroxy group in the pentaerythritol.

11. A composition of matter comprising the resinous reaction product of (a) fumaric acid, (b) an unsaturated oil fatty acid, (c) the adduct of ethylene oxide with dipentaerythritol and (d) from about 1% to about 60% by weight based on the total resin solids of the composition of rosin acids wherein said adduct contains from about 3 mols to about 7 mols of ethylene oxide per hydroxy group in the dipentaerythritol.

12. A composition of matter comprising the resinous reaction product of (a) fumaric acid, (b) linseed oil fatty acids, (c) the adduct of ethylene oxide with sorbitol and (d) from about 1% to about 60% by weight based on the total resin solids of the composition of rosin acids wherein said adduct contains from about 3 mols to about 7 mols of ethylene oxide per hydroxy group in the sorbitol.

13. A composition of matter comprising the resinous reaction product of (a) maleic anhydride, (b) linseed oil fatty acids, (c) the adduct of ethylene oxide with sorbitol and (d) from about 1% to about 60% by weight based on the total resin solids of the composition of rosin acids wherein said adduct contains from about 3 mols to about 7 mols of ethylene oxide per hydroxy group in the sorbitol.

14. A composition of matter comprising the resinous reaction product of (a) fumaric acid, (b) linseed oil fatty acids, (c) the adduct of ethylene oxide with pentaerythritol and (d) from about 1% to about 60% by weight based on the total resin solids of the composition of rosin acids wherein said adduct contains from about 3 mols to about 7 mols of ethylene oxide per hydroxy group in the pentaerythritol.

15. A composition of matter comprising the resinous reaction product of (a) maleic anhydride, (b) linseed oil fatty acids, (c) the adduct of ethylene oxide with pentaerythritol and (d) from about 1% to about 60% by weight based on the total resin solids of the composition of rosin acids wherein said adduct contains from about 3 mols to about 7 mols of ethylene oxide per hydroxy group in the pentaerythritol.

16. A composition of matter comprising the resinous reaction product of (a) fumaric acid, (b) linseed oil fatty acids, (c) the adduct of ethylene oxide with dipentaerythritol and (d) from about 1% to about 60% by weight based on the total resin solids of the composition of rosin acids wherein said adduct contains from about 3 mols to about 7 mols of ethylene oxide per hydroxy group in the dipentaerythritol.

References Cited in the file of this patent
UNITED STATES PATENTS

| | | |
|---|---|---|
| 2,134,429 | Brown | Oct. 25, 1938 |
| 2,360,394 | Burrell | Oct. 17, 1944 |
| 2,537,949 | Adams | Jan. 16, 1951 |